(12) United States Patent
Ohki

(10) Patent No.: US 6,980,237 B2
(45) Date of Patent: *Dec. 27, 2005

(54) IMAGE PROCESSING METHOD

(75) Inventor: Mitsuharu Ohki, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/104,184

(22) Filed: Apr. 12, 2005

(65) Prior Publication Data

US 2005/0185059 A1    Aug. 25, 2005

Related U.S. Application Data

(63) Continuation of application No. 10/121,065, filed on Apr. 11, 2002, now Pat. No. 6,924,836.

(30) Foreign Application Priority Data

Apr. 12, 2001   (JP) .......................... P2001-113421

(51) Int. Cl.⁷ ............................................ H04N 5/228
(52) U.S. Cl. .................... 348/208.6; 382/176
(58) Field of Search .................. 348/208.6, 208.5, 348/208.4, 208.1, 208.13, 222.1, 416.1; 375/240.16; 358/464; 382/176, 173, 174, 254

(56) References Cited

U.S. PATENT DOCUMENTS

| | | | |
|---|---|---|---|
| 5,177,608 A * | 1/1993 | Ohki et al. | 348/416.1 |
| 2002/0118287 A1 * | 8/2002 | Grosvenor et al. | 348/222.1 |
| 2002/0172286 A1 * | 11/2002 | Ohki | 382/176 |
| 2003/0156203 A1 * | 8/2003 | Kondo et al. | 348/222.1 |
| 2004/0005084 A1 * | 1/2004 | Kondo et al. | 348/208.1 |
| 2004/0022448 A1 * | 2/2004 | Kondo et al. | 382/254 |
| 2004/0052415 A1 * | 3/2004 | Kondo et al. | 382/173 |
| 2004/0057602 A1 * | 3/2004 | Kondo et al. | 382/173 |
| 2004/0061795 A1 * | 4/2004 | Kondo et al. | 348/208.6 |
| 2004/0066460 A1 * | 4/2004 | Kondo et al. | 348/222.1 |
| 2004/0067040 A1 * | 4/2004 | Kondo et al. | 348/222.1 |
| 2004/0075749 A1 * | 4/2004 | Kondo et al. | 348/222.1 |
| 2004/0081335 A1 * | 4/2004 | Kondo et al. | 382/173 |

* cited by examiner

Primary Examiner—Aung S. Moe
(74) Attorney, Agent, or Firm—Bell, Boyd & LLoyd LLC

(57) ABSTRACT

An image processing apparatus and method, wherein a reference area is specified in a first step, a foreground is specified in the reference area in a second step, the degree T1 of appropriateness is calculated in a third step, the degree T2 of appropriateness is calculated in a fourth step, the degree T3 of appropriateness is calculated in a fifth step, and, in a sixth step, a comparison area having the maximum sum of the degrees T1, T2, and T3 of appropriateness is set to a matching area corresponding to the reference area, in a comparison image.

1 Claim, 7 Drawing Sheets t = t2

P2' t = t3

P3'

IMAGE PROCESSING METHOD

CROSS REFERENCE TO RELATED APPLICATIONS

The present application is a continuation of U.S. patent application Ser. No. 10/121,065 filed on Apr. 11, 2002, now U.S. Pat. No. 6,924,836, which claims priority to Japanese Patent Application No. P2001-113421 filed on Apr. 12, 2001, the above-referenced disclosures of which are herein incorporated by reference.

BACKGROUND OF THE INVENTION

The present invention relates to image processing apparatuses, image processing methods, recording media, and programs, and more particularly, to an image processing apparatus, an image processing method, a recording medium, and a program which are suitable for a case in which a motion vector is detected among a number of images consecutively captured.

When a video camera is held by a hand or hands and is used for image capturing without securing it by a tripod or others, captured motion images may vibrate horizontally and vertically due to shaking of the hand(s). Thus, it is difficult for the viewer to see the images distinctly when they are reproduced. As a countermeasure to solve this problem, a so-called stabilizer processing, which converts vibrating motion images to non-vibrating motion images, has been known.

The stabilizer processing will be described below by referring to FIG. 1 through FIG. 6. FIG. 1 to FIG. 3 show images $P_1$ to $P_3$ captured at timing $t_1$ to $t_3$ among motion images vibrating due to shaking of a hand or hands. The motion images indicate a case in which a person moves from the left-hand side to the right-hand side in a room provided with a desk and a door which are unmoved.

In the stabilizer processing, an area (for example, an area which includes an edge of a still object, such as the desk) having a predetermined size and a feature is first specified in the image $P_1$ (hereinafter, called a reference image $P_1$) captured at timing $t_1$, shown in FIG. 1. For example, an area $R_1$ enclosed by a dotted line and located at a position (X1, Y1) measured from the origin (0, 0) of the reference image $P_1$ is specified. The specified area $R_1$ is hereinafter called a reference area $R_1$.

Next, a matching area (area $M_1$ in FIG. 2) corresponding to the reference area $R_1$ in the reference image $P_1$ is detected by a block matching method in the image $P_2$ (hereinafter, called a comparison image $P_2$) captured at timing $t_2$, shown in FIG. 2.

In the block matching method, the entire comparison image $P_2$ is searched for an area having the minimum value of the sum of square errors or the sum of absolute errors between pixels in the reference area $R_1$ and the corresponding pixels, or having the maximum value of the normalized cross correlation between the pixels in the reference area $R_1$ and the corresponding pixels to detect the matching area $M_1$ corresponding to the reference area $R_1$.

To reduce the amount of calculation in the block matching method, an area smaller than the entire comparison image $P_2$ may be searched. When it has been found that a motion vector between images corresponds to about 10 pixels, for example, an area larger than the reference area $R_1$ by about 10 pixels horizontally and vertically is to be searched.

Details of the block matching method are described, for example, in "Matching," Chapter 8.3 of "Digital Image Processing" supervised by Makoto Nagao and published by Kindai Kagaku Sha Co., Ltd.

The detected matching area $M_1$ is located at (X2, Y2) measured from the origin (0, 0) of the comparison image $P_2$. In the same way, a matching area (matching area $M_2$ shown in FIG. 3) corresponding to the reference area $R_1$ is detected by the block matching method in the image $P_3$ (hereinafter, called a comparison image $P_3$) captured at timing $t_3$, shown in FIG. 3. The matching area $M_2$ is located at (X3, Y3) measured from the origin (0, 0) of the comparison image $P_3$.

Then, a motion vector $V_{12}$ (X1-X2, Y1-Y2) between the reference image $P_1$ and the comparison image $P_2$, and a motion vector $V_{13}$ (X1-X3, Y1-Y3) between the reference image $P_1$ and the comparison image $P_3$ are calculated. The reference image $P_1$ is set to a compensated image $P_1$', as is, the comparison image $P_2$ is shifted by the motion vector $V_{12}$ (X1-X2, Y1-Y2) to form a compensated image $P_2$', and the comparison image $P_3$ is shifted by the motion vector $V_{13}$ (X1-X3, Y1-Y3) to form a compensated image $P_3$'.

As described above, by the stabilizing processing, the reference image $P_1$ and the comparison images $P_2$ and $P_3$ are converted to the compensated images $P_1$' to $P_3$' shown in FIG. 4 to FIG. 6. As shown in FIG. 4 to FIG. 6, in the compensated images $P_1$' to $P_3$', still objects, such as the desk, a chair, and the door, are located at identical locations. Actually, the original motion images other than the images $P_1$ to $P_3$ are also converted in the same way. Therefore, when a number of converted consecutive images are reproduced, these motion images do not vibrate.

When the area $R_1$ is set to a reference area in the reference image $P_1$, matching areas corresponding to the reference area are detected in comparison images by the block matching method to obtain appropriate motion vectors. When an inappropriate area is set to a reference area in the reference image $P_1$, however, a matching area corresponding to the reference area in the reference image $P_1$ may be undetected in a comparison image. In such a case, a motion vector between the reference image $P_1$ and the comparison image cannot be obtained, and vibrating motion images cannot be compensated.

It is assumed, for example, that an area $R_2$ is set to a reference area in the reference image $P_1$. The reference area $R_2$ includes a feature portion (also called a foreground), such as an edge of the still desk, and the other portion (also called a background). Since a matching area in the comparison image $P_2$, which is to be detected as an area corresponding to the reference area $R_2$ in the reference image $P_1$, includes a moving person, that area cannot be detected as a matching area corresponding to the reference area $R_2$.

SUMMARY OF THE INVENTION

The present invention has been made in consideration of the foregoing condition. It is an object of the present invention to divide the foreground of a reference area in a reference image by a segment to always allow a matching area corresponding to the reference area in the reference image to be detected in a comparison image.

The foregoing object is achieved in one embodiment of the present invention through the provision of an image processing apparatus for detecting a motion vector between a reference image and a comparison image, wherein the apparatus includes an image input for inputting the reference image and the comparison image; a receiver for receiving user's operations; a reference-area specifier for specifying a first reference area in the reference image according to a user's operation received by the receiver; a divider for setting a boundary used for dividing the first reference area into a foreground and a background, according to a user's operation received by the receiver; a comparison-area specifier for specifying a number of comparison areas in the comparison image; a first calculator for calculating a first degree of appropriateness indicating the degree of correlation between the foreground of the first reference area and each of the number of comparison areas; a generator for generating a second reference area by differentiating a portion close to the boundary of the first reference area in a direction perpendicular to the boundary; a second calculator for calculating a second degree of appropriateness indicating the degree of correlation between a portion close to the boundary of the second reference area and each of the number of comparison areas; a determination part for determining a matching area corresponding to the first reference area among the number of comparison areas according to the sum of the first and second degrees of appropriateness; and an operator for calculating the motion vector between the reference image and the comparison image according to the position of the first reference area in the reference image and the position of the matching area in the comparison image.

The image processing apparatus may be configured such that the receiver means receives a user's operation of drawing a line; and the divider sets at least one segment drawn by the user to the boundary, which divides the first reference area into the foreground and the background.

The image processing apparatus may further include a compensator for generating a compensated image by shifting the entire comparison image according to the motion vector.

The foregoing object is achieved in another embodiment of the present invention through the provision of an image processing method for an image processing apparatus for detecting a motion vector between a reference image and a comparison image, wherein the method includes an image input step of inputting the reference image and the comparison image; a receiving step of receiving user's operations; a reference-area specifying step of specifying a first reference area in the reference image according to a user's operation received in the receiving step; a dividing step of setting a boundary used for dividing the first reference area into a foreground and a background, according to a user's operation received in the receiving step; a comparison-area specifying step of specifying a number of comparison areas in the comparison image; a first calculation step of calculating a first degree of appropriateness indicating the degree of correlation between the foreground of the first reference area and each of the number of comparison areas; a generation step of generating a second reference area by differentiating a portion close to the boundary of the first reference area in a direction perpendicular to the boundary; a second calculation step of calculating a second degree of appropriateness indicating the degree of correlation between a portion close to the boundary of the second reference area and each of the number of comparison areas; a determination step of determining a matching area corresponding to the first reference area among the number of comparison areas according to the sum of the first and second degrees of appropriateness; and an operation step of calculating the motion vector between the reference image and the comparison image according to the position of the first reference area in the reference image and the position of the matching area in the comparison image.

The image processing method may be configured such that a user's operation of drawing a line is received in the receiving step; and at least one segment drawn by the user is set to the boundary, which divides the first reference area into the foreground and the background, in the dividing step.

The image processing method may further include a compensation step of generating a compensated image by shifting the entire comparison image according to the motion vector.

The foregoing object is achieved in still another aspect of the present invention through the provision of a recording medium recording a computer-readable program for detecting a motion vector between a reference image and a comparison image, wherein the program includes an image input step of inputting the reference image and the comparison image; a receiving step of receiving user's operations; a reference-area specifying step of specifying a first reference area in the reference image according to a user's operation received in the receiving step; a dividing step of setting a boundary used for dividing the first reference area into a foreground and a background, according to a user's operation received in the receiving step; a comparison-area specifying step of specifying a number of comparison areas in the comparison image; a first calculation step of calculating a first degree of appropriateness indicating the degree of correlation between the foreground of the first reference area and each of the number of comparison areas; a generation step of generating a second reference area by differentiating a portion close to the boundary of the first reference area in a direction perpendicular to the boundary; a second calculation step of calculating a second degree of appropriateness indicating the degree of correlation between a portion close to the boundary of the second reference area and each of the number of comparison areas; a determination step of determining a matching area corresponding to the first reference area among the number of comparison areas according to the sum of the first and second degrees of appropriateness; and an operation step of calculating the motion vector between the reference image and the comparison image according to the position of the first reference area in the reference image and the position of the matching area in the comparison image.

The program recorded in the recording medium may be configured such that a user's operation of drawing a line is received in the receiving step; and at least one segment drawn by the user is set to the boundary, which divides the first reference area into the foreground and the background, in the dividing step.

The program recorded in the recording medium may further include a compensation step of generating a compensated image by shifting the entire comparison image according to the motion vector.

In the image processing apparatus, the image processing method, the recording medium, and the program according to the present invention, a reference image and a comparison image are input, user's operations are received, a first reference area is specified in the reference image according to a received user's operation, and a boundary for dividing the first reference area into the foreground and the background is set according to a user's operation. A number of comparison areas are specified in the comparison image, and a first degree of appropriateness indicating the degree of correlation between the foreground of the first reference area and each of the number of comparison areas is calculated. A second reference area is generated by differentiating a portion close to the boundary in the first reference area in a direction perpendicular to the boundary. A second degree of appropriateness indicating the degree of correlation between the portion close to the boundary in the second reference area and each of the number of comparison areas is calculated. According to the sum of the first and second degrees of appropriateness, a matching area corresponding to the first reference area is determined among the number of comparison areas. Therefore, the matching area always can be detected. Then, a motion vector is calculated between the reference area and the comparison area according to the position of the first reference area in the reference image and the position of the matching area in the comparison image.

Additional features and advantages of the present invention are described in, and will be apparent from, the following Detailed Description of the Invention and the Figures.

DETAILED DESCRIPTION OF THE INVENTION

Figure 1:
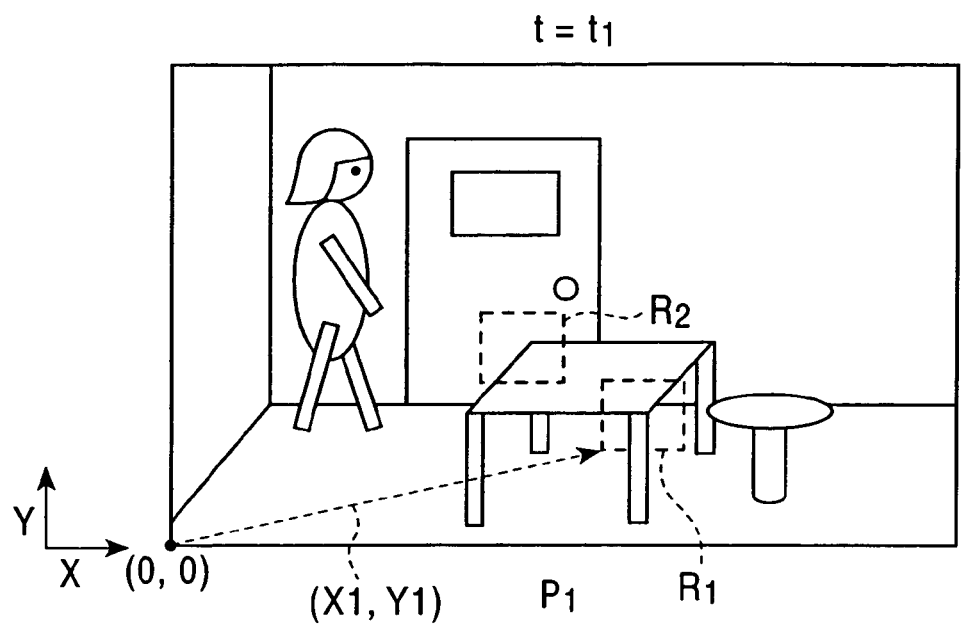
FIG. 1 is a view used for describing conventional stabilizer processing.
Figure 2:
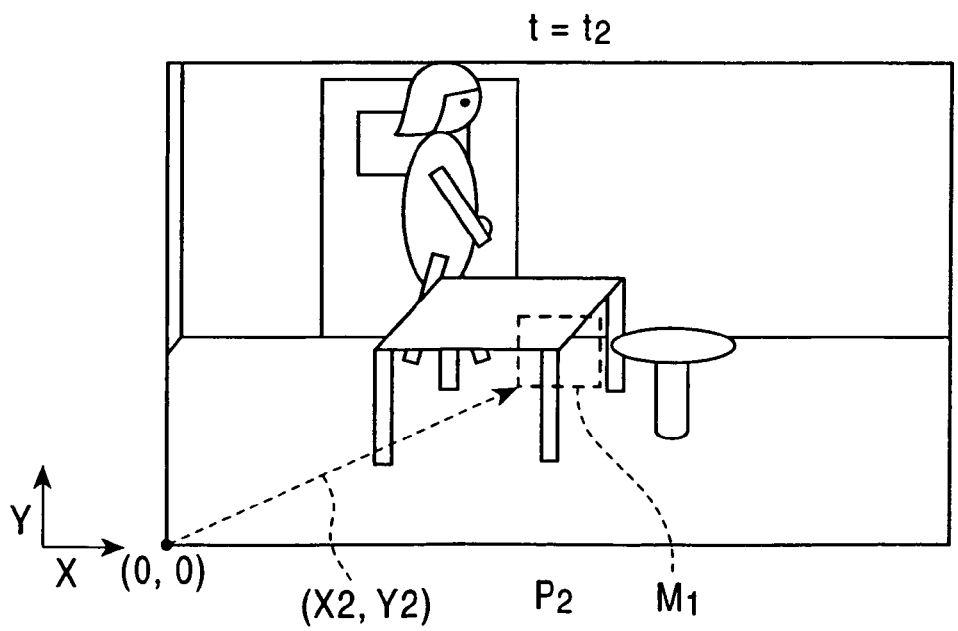
FIG. 2 is a further view used for describing the conventional stabilizer processing.
Figure 3:
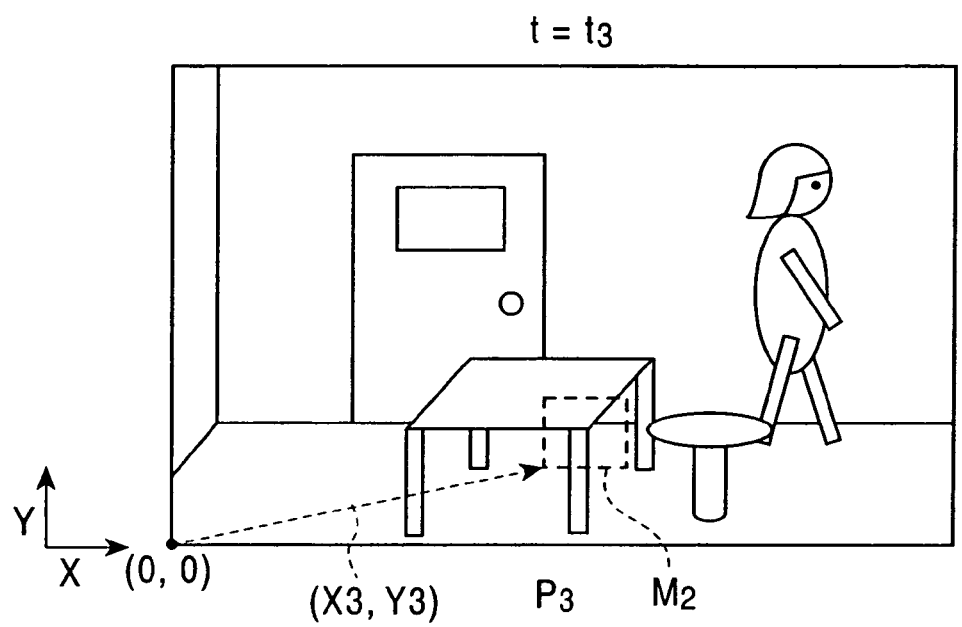
FIG. 3 is a further view used for describing the conventional stabilizer processing.
Figure 4:
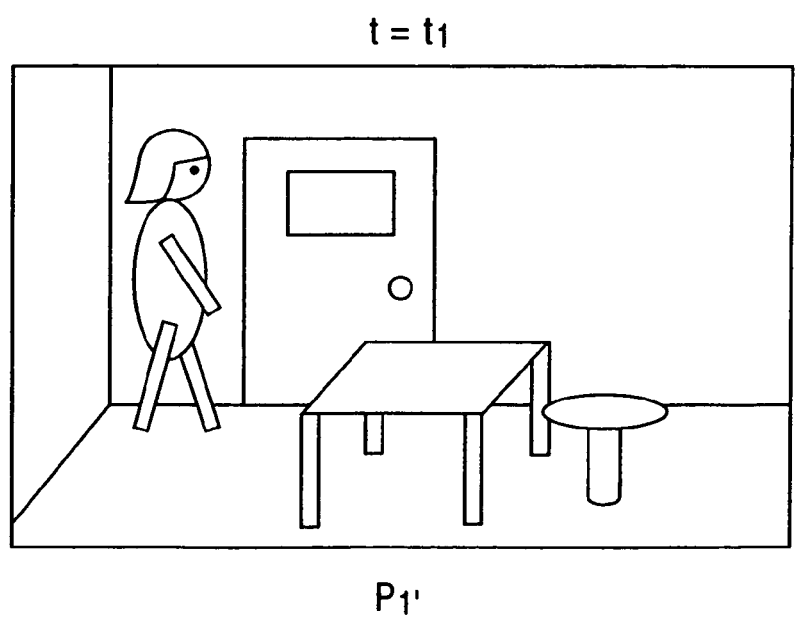
FIG. 4 is a further view used for describing the conventional stabilizer processing.
Figure 5:
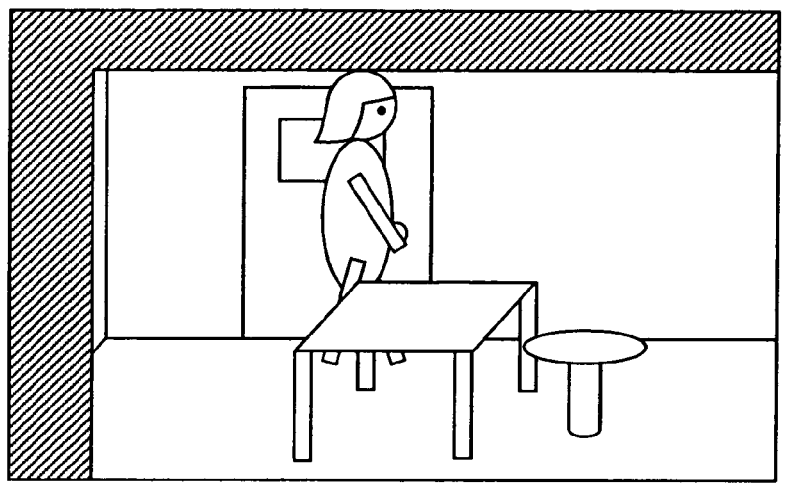
FIG. 5 is a further view used for describing the conventional stabilizer processing.
Figure 6:
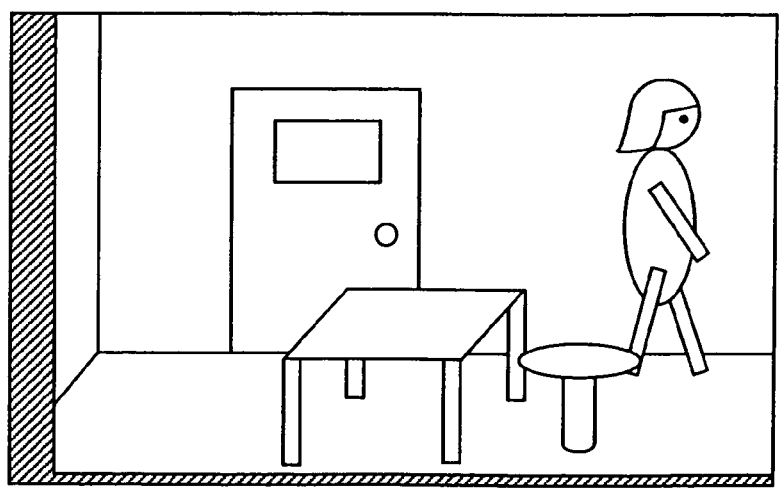
FIG. 6 is a further view used for describing the conventional stabilizer processing.
Figure 7:
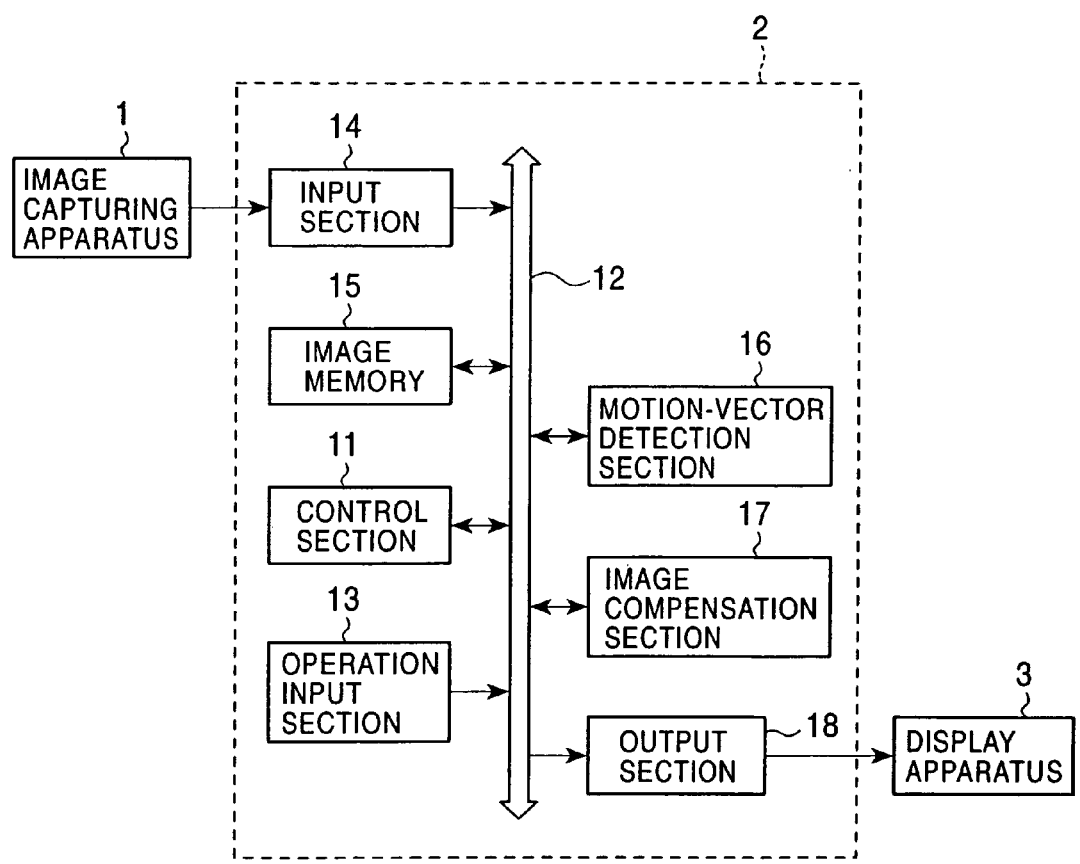
FIG. 7 is a block diagram of an image processing apparatus 2 according to an embodiment of the present invention.

An image processing apparatus according to an embodiment of the present invention will be described below by referring to FIG. 7. The image processing apparatus 2 receives motion images (still images consecutively captured) from an image capturing apparatus 1, converts them to motion images not vibrating, and outputs them to a display apparatus 3. It is assumed that the image processing apparatus 2 receives motion images which include the reference image $P_1$ and the comparison images $P_2$ and $P_3$, shown in FIG. 1 to FIG. 3, from the image capturing apparatus 1.

In the image processing apparatus 2, a control section 11 controls each section of the image processing apparatus 2 through a bus 12 according to operation information input by the user from an operation input section 13. The operation input section 13 receives user's operations, such as that for specifying a reference area R having a predetermined size and feature in the reference image $P_1$ and that for specifying a number of segments (two segments $L_1$ and $L_2$, for example) to specify a foreground (the still desk shown in FIG. 1, for example) in the reference area R, and outputs the information of the operations to the control section 11 through the bus 12. An input section 14 receives motion images input from the image capturing apparatus 1 and outputs them to an image memory 15 through the bus 12. The image memory 15 stores the motion images (still images consecutively captured) sent from the input section 14 through the bus 12.

A motion-vector detection section 16 sequentially reads the still images constituting the motion images stored in the image memory 15, sets the first image to the reference image $P_1$ (for example, specifies a reference area R according to a user's operation), and specifies a foreground in the reference area R. In addition, the motion-vector detection section 16 sets the images to be read thereafter to comparison images Pn (n=2, 3, 4, . . . ), detects a matching area corresponding to the reference area R in the reference image $P_1$ in the comparison image Pn, calculates a motion vector $V_{1n}$ (X1-Xn, Y1-Yn) between the reference image $P_1$ and the comparison image Pn, and outputs the calculated motion vector $V_{1n}$ to an image compensation section 17 through the bus 12.

The image compensation section 17 reads the reference image $P_1$ from the image memory 15, sets it to a compensated image $P_1'$, and sends it to an output section 18 through the bus 12. The image compensation section 17 also reads the comparison image Pn from the image memory 15, shifts the read comparison image Pn by the motion vector $V_{1n}$ to form a compensated image Pn', and sends it to the output section 18 through the bus 12. The output section 18 outputs the reference image $P_1$ or the screen being manipulated, to the display apparatus 3 for an operation to specify the reference area R in the reference image $P_1$ or for an operation to specify the foreground of the reference area R. The output section 18 also buffers the compensated images $P_1'$ and Pn' (n=2, 3, 4, . . . ) sent from the image compensation section 17 through the bus 12, and outputs them to the display apparatus 3 at a predetermined rate.

Compensation processing performed by the image processing apparatus 2 will be described next by referring to a flowchart shown in FIG. 8. It is assumed that the image memory 15 of the image processing apparatus 2 has already stored motion images (a number of still images consecutively captured) input from the image capturing apparatus 1 through the input section 1 and the bus 12.

In step S1, the motion-vector detection section 16 reads the first image of the motion images (a number of consecutive images) stored in the image memory 15, sets it to the reference image $P_1$, and specifies the reference area R according to a user's operation on the operation input section 13. In step S2, the motion-vector detection section 16 sets an area specified by a segment drawn by the user to a still foreground (unchanged portion even in corresponding parts in comparison images) in the reference area R.

Figure 9:
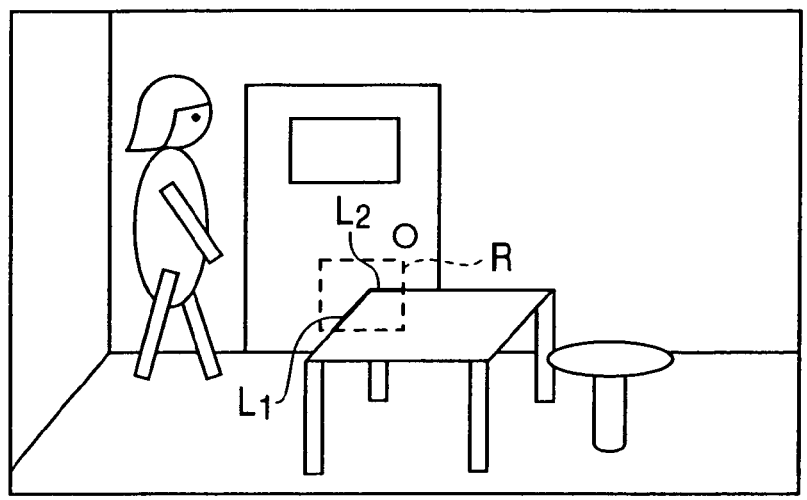
FIG. 9 is a view used for describing a user's operation for specifying a reference area.
Figure 10:
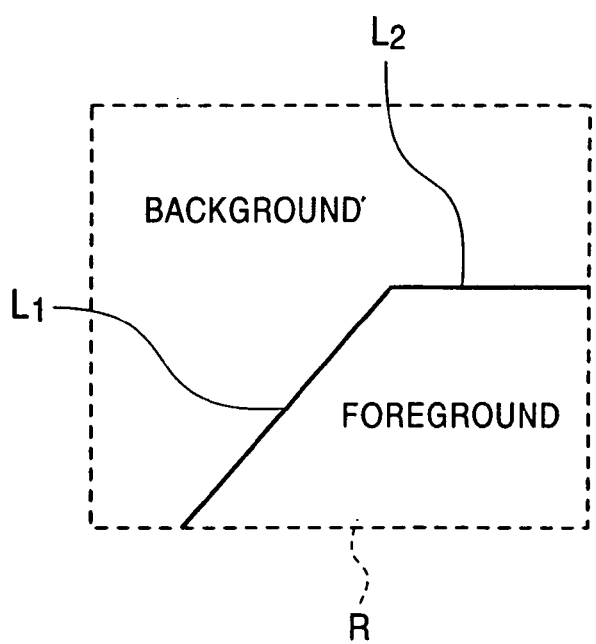
FIG. 10 is a view used for describing a user's operation for specifying a foreground in a reference area.

The user's operations in steps S1 and S2 will be specifically described by referring to FIG. 9 and FIG. 10. FIG. 9 shows an example reference image $P_1$ displayed on the display apparatus 3. As shown in FIG. 9, the user moves a rectangle indicated by a dotted line and superposed on the reference image $P_1$ to specify the reference area R. In addition, as shown in FIG. 10, for example, the user draws segments $L_1$ and $L_2$ to set an area enclosed by the segments $L_1$ and $L_2$ and the dotted line indicating the reference area R to a still foreground (an unchanged portion even in corresponding parts in comparison images) of the reference area R. The number of segments used to specify the foreground is not limited to two. One segment may be used, or three or more segments may be used.

Figure 8:
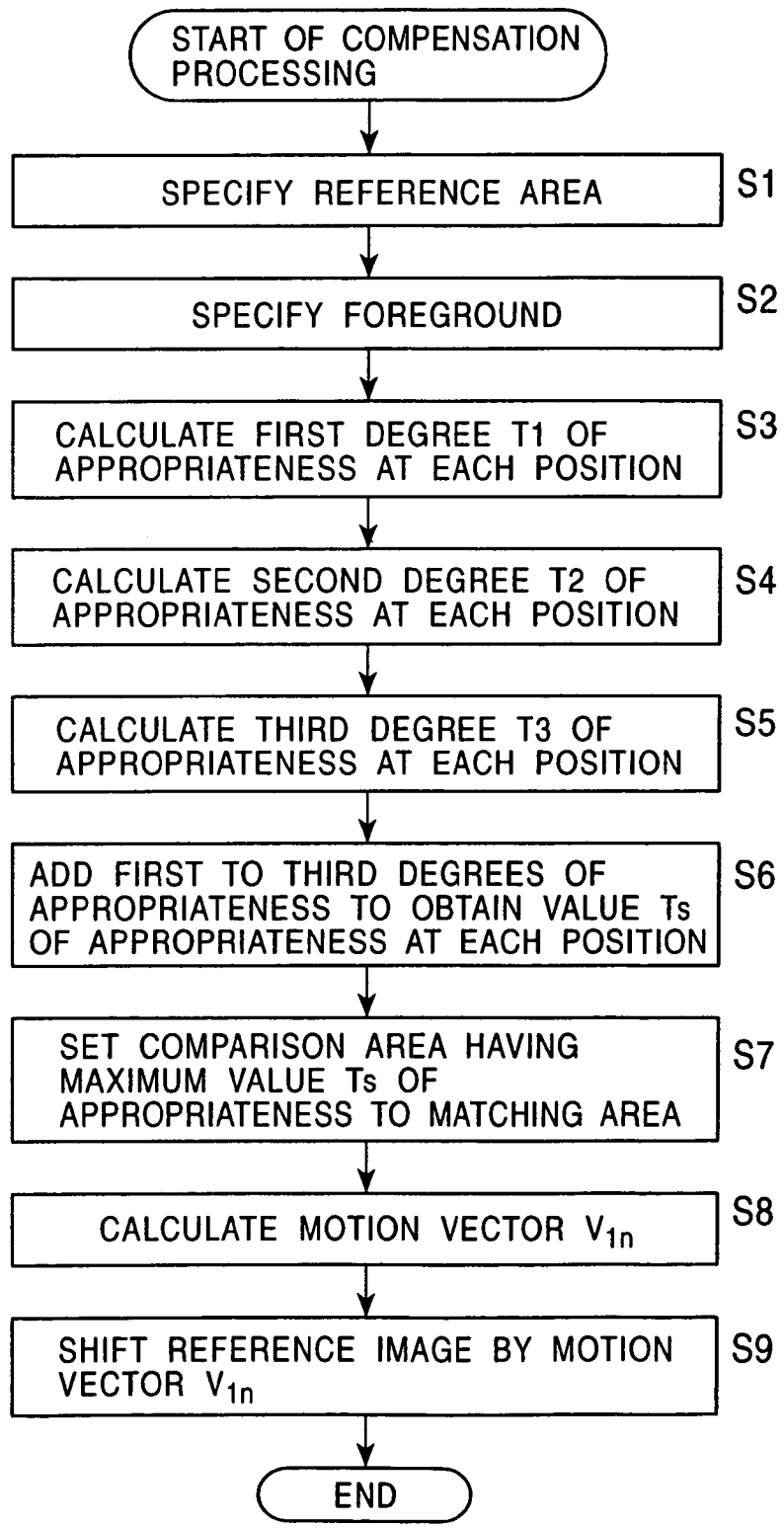
FIG. 8 is a flowchart of compensation processing performed by the image processing apparatus 2.

Back to FIG. 8, in step S3, the motion-vector detection section 16 reads the comparison image $P_2$, following the reference image $P_1$, from the image memory 15, sets a comparison area Ci (i=1, 2, ..., and m) having the same size as the reference area R, in the comparison image $P_2$ by moving the comparison area in units of several pixels, and calculates the degree T1$i$ of appropriateness between each pixel in the foreground of the reference area R and the corresponding pixel in the comparison area Ci. The degree T1$i$ of appropriateness is calculated according to the minimum value of the sum of square errors or the sum of absolute errors or the maximum value of the normalized cross correlation.

In step S4, the motion-vector detection section 16 differentiates a portion close to the segment $L_1$ in the reference area R in a direction perpendicular to the segment $L_1$. The reference area R in which the portion close to the segment $L_1$ is differentiated in the direction perpendicular to the segment $L_1$ is hereinafter called a first differential reference area $R_{L1}$. The motion-vector detection section 16 also differentiates the comparison area Ci of the comparison image $P_2$ in a direction perpendicular to the segment $L_1$. The comparison area Ci differentiated in the direction perpendicular to the segment $L_1$ is hereinafter called a first differential comparison area $C_{iL1}$.

Further, the motion-vector detection section 16 calculates the degree T2$i$ of appropriateness between each pixel in the first differential reference area $R_{L1}$ and the corresponding pixel in the first differential comparison area $C_{iL1}$. The degree T2$i$ of appropriateness is calculated according to the minimum value of the sum of square errors or the sum of absolute errors or the maximum value of the normalized cross correlation.

In step S5, the motion-vector detection section 16 differentiates a portion close to the segment $L_2$ in the reference area R in a direction perpendicular to the segment $L_2$. The reference area R in which the portion close to the segment $L_2$ is differentiated in the direction perpendicular to the segment $L_2$ is hereinafter called a second differential reference area $R_{L2}$. The motion-vector detection section 16 also differentiates the comparison area Ci of the comparison image $P_2$ in a direction perpendicular to the segment $L_2$. The comparison area Ci differentiated in the direction perpendicular to the segment $L_2$ is hereinafter called a second differential comparison area $C_{iL2}$.

Further, the motion-vector detection section 16 calculates the degree T3$i$ of appropriateness between each pixel in the second differential reference area $R_{L2}$ and the corresponding pixel in the second differential comparison area $C_{iL2}$. The degree T3$i$ of appropriateness is calculated according to the minimum value of the sum of square errors or the sum of absolute errors or the maximum value of the normalized cross correlation.

In step S6, the motion-vector detection section 16 adds the degrees T1$i$, T2$i$, and T3$i$ of appropriateness calculated for the comparison area Ci to obtain the value Tsi of appropriateness. In step S7, the motion-vector detection section 16 detects the maximum value of the value Tsi of appropriateness, and determines the comparison area Ci corresponding to the maximum value of the value Tsi of appropriateness as the matching area of the comparison image $P_2$, corresponding to the reference area R.

In step S8, the motion-vector detection section 16 calculates a motion vector $V_{12}$ between the reference image $P_1$ and the comparison image $P_2$, and outputs the calculated motion vector $V_{12}$ to the image compensation section 17 through the bus 12. In step S9, the image compensation section 17 reads the comparison image $P_2$ from the image memory 15, shifts the read comparison image $P_2$ by the motion vector $V_{12}$ to form a compensated image $P_2'$, and sends it to the output section 18 through the bus 12.

The processes from step S3 to step S9 are applied to comparison images Pn following the comparison image $P_2$ to form compensated images Pn'.

As described above, in the image processing apparatus 2 according to an embodiment of the present invention, when a matching area corresponding to the reference area R is detected, since only the foreground of the reference area and the boundary between the foreground and background are used without taking the background into consideration, even if the background is changed as time passes, a matching area can be detected correctly. Therefore, since a correct motion vector can be obtained, vibrating motion images can be converted to not-vibrating motion images.

The above-described series of processing can be executed not only by hardware, such as the image processing apparatus 2, but also by software. When the series of processing is executed by software, a program constituting the software is installed from a recording medium to a computer built in special hardware, or to an apparatus which can execute various functions by installing various programs, such as a general-purpose personal computer.

Figure 11:
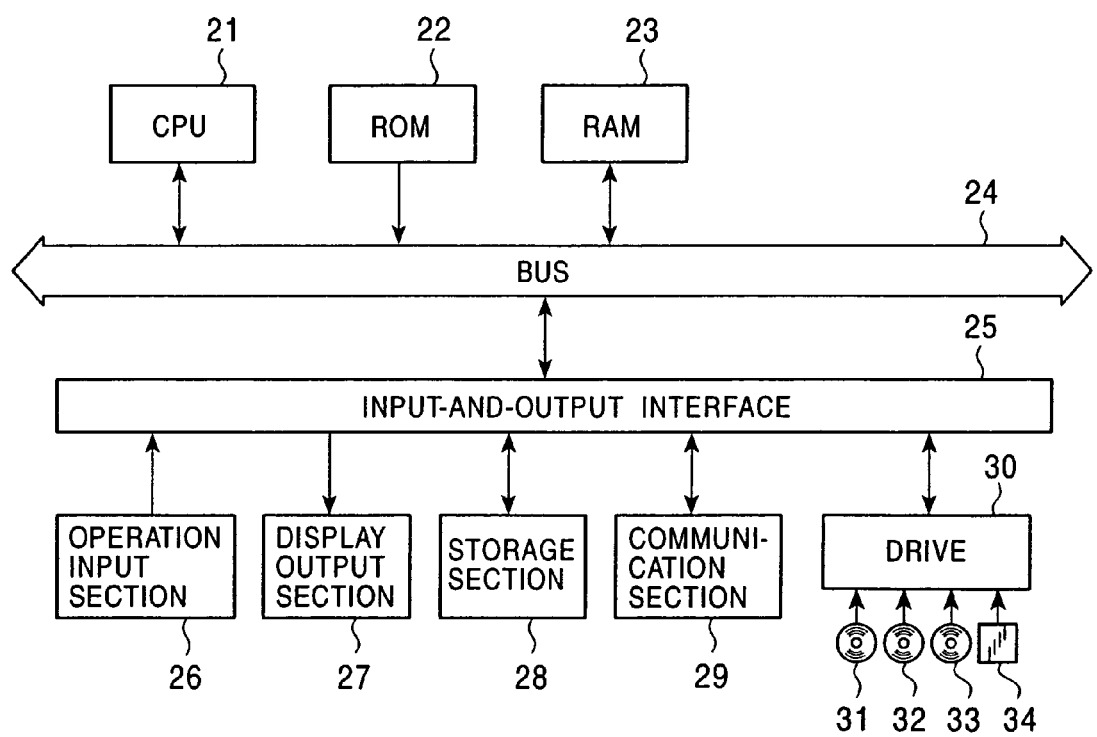
FIG. 11 is a block diagram of a general-purpose personal computer.

The recording medium can be a package medium which is distributed separately from a computer to provide the user with the program and in which the program is recorded, such as a magnetic disk 31 (including a floppy disk), an optical disk 32 (including compact disk read only memory (CD-ROM) and a digital versatile disk (DVD)), a magneto-optical disk 33 (including a Mini disk (MD)), or a semiconductor memory 34, as shown in FIG. 11. In addition, the recording medium can be a device in which the program is recorded and which is provided for the user in a condition in which it is built in a computer in advance, such as a ROM 22 or a hard disk included in a storage section 28.

In the present specification, steps describing the program recorded in a recording medium include not only processing to be executed in a time-sequential manner in a described order, but also processing which is not necessarily executed time-sequentially but is executed in parallel or independently.

In the present specification, a system refers to the entire apparatus formed of a number of units.

Although the present invention has been described with reference to specific embodiments, those of skill in the art will recognize that changes may be made thereto without departing from the spirit and scope of the present invention as set forth in the hereafter appended claims.

The invention is claimed as follows:

1. A system for detecting a motion vector between a reference image and a comparison image, comprising:
   an image input for inputting the reference image and the comparison image;
   a receiver for receiving a user's operations;
   a reference-area specifier for specifying a first reference area in the reference image according to the user's operation received by the receiver;
   a divider for setting a boundary used for dividing the first reference area into a foreground and a background, according to the user's operation received by the receiver;
   a comparison-area specifier for specifying a plurality of comparison areas in the comparison image;
   a first calculator for calculating a first degree of appropriateness indicating a degree of correlation between the foreground of the first reference area and each of the plurality of comparison areas;

a generator for generating a second reference area by differentiating a portion close to the boundary of the first reference area in a direction perpendicular to the boundary;

a second calculator for calculating a second degree of appropriateness indicating a degree of correlation between a portion close to the boundary of the second reference area and each of the plurality of comparison areas;

a determination part for determining a matching area corresponding to the first reference area among the plurality of comparison areas according to a sum of the first and second degrees of appropriateness; and an operator for calculating the motion vector between the reference image and the comparison image according to a position of the first reference area in the reference image and a position of the matching area in the comparison image.

* * * * *